UNITED STATES PATENT OFFICE.

HEZAEMON MISAKI, OF SAN FRANCISCO, CALIFORNIA.

COMPOSITION OF MATTER FOR POLISHING FURNITURE.

1,009,547. Specification of Letters Patent. Patented Nov. 21, 1911.

No Drawing. Application filed June 13, 1911. Serial No. 632,986.

*To all whom it may concern:*

Be it known that I, HEZAEMON MISAKI, a subject of Japan, and resident of the United States, residing in the city and county of San Francisco, State of California, have invented a new and useful Composition of Matter to be Used for the Polishing of Furniture and other Woodwork, of which the following is a specification.

My composition consists of the following ingredients, combined in the proportions stated, viz:

Cotton seed oil, refined _____ 15 gallons.
White of eggs, substantially pure and fresh _____ 17 pounds.
Yolk of eggs, substantially pure and fresh _____ 23 pounds.
Formalin _____ 2 ounces.
Alcohol _____ 1 ounce.

These ingredients are to be thoroughly mingled by agitation.

In using the above named composition, the furniture or other wood work should first be rubbed with a piece of clean cloth soaked with the composition, and then wiped off with another piece of clean dry cloth. The application of the composition will result in a clean and bright luster of the original color on the surface to which the composition is applied and will leave no moisture or vapor behind to cause finger marks or catch dust.

I am not aware that all the ingredients of my composition have been used together by any other person heretofore for the purpose aforesaid.

I claim:

1. The herein-described composition of matter, consisting of cotton seed oil, white of eggs, yolk of eggs, formalin, and alcohol, substantially as described and for the purpose specified.

2. The herein-described composition of matter for polishing furniture and other wood work, consisting of cotton seed oil, refined, fifteen gallons, white of eggs, pure and fresh, seventeen pounds, yolk of eggs, pure and fresh, twenty-three pounds, formalin two ounces, and alcohol one ounce, substantially as described.

HEZAEMON MISAKI.

Witnesses:
FUSA SAITO,
F. TANIGUCHI.

Copies of this patent may be obtained for five cents each, by addressing the "Commissioner of Patents, Washington, D. C."